United States Patent [19]
Suchner

[11] 3,743,213
[45] July 3, 1973

[54] GUIDED MISSILES

[75] Inventor: Donald R. Suchner, Cuyahoga Falls, Ohio

[73] Assignee: Goodyear Aerospace Corporation, Akron, Ohio

[22] Filed: Feb. 19, 1952

[21] Appl. No.: 272,464

[52] U.S. Cl.................................. 244/3.1, 102/49.1
[51] Int. Cl. ... F42b 15/02, F42b 15/18, F42b 15/00
[58] Field of Search .................. 102/49, 50; 244/14, 244/3.1

[56] References Cited
UNITED STATES PATENTS
2,503,271  4/1950  Hickman............................... 102/50

FOREIGN PATENTS OR APPLICATIONS
861,605  11/1940  France................................. 102/50

*Primary Examiner*—Benjamin A. Borchelt
*Assistant Examiner*—T. H. Webb
*Attorney*—A. H. Oldham

EXEMPLARY CLAIM

3. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket disposed within and substantially parallel with said fuselage, a pair of rocket supporting tracks having their upper surface below the rocket center and adapted to support the rocket in one position or in a second position wherein the rocket is turned 180° about its longitudinal axis, driving lugs extending diametrically and transversely from the front end of the rocket and resting on said tracks, thrust abutment means on the fuselage for said driving lugs, a pair of vertically extending lugs on the rocket near the rocket rear portion, means on the fuselage for sideways holding said vertical lugs, latch means for longitudinally holding the rocket in place, and a rearwardly extending exhaust nozzle on the rocket, said nozzle being canted from the longitudinal center line of the rocket so that the nozzle center line in one position passes through one of said centers of gravity and when the rocket is turned 180° about its longitudinal center line the nozzle center passes through the other one of said centers of gravity.

6 Claims, 4 Drawing Figures

Patented July 3, 1973 3,743,213
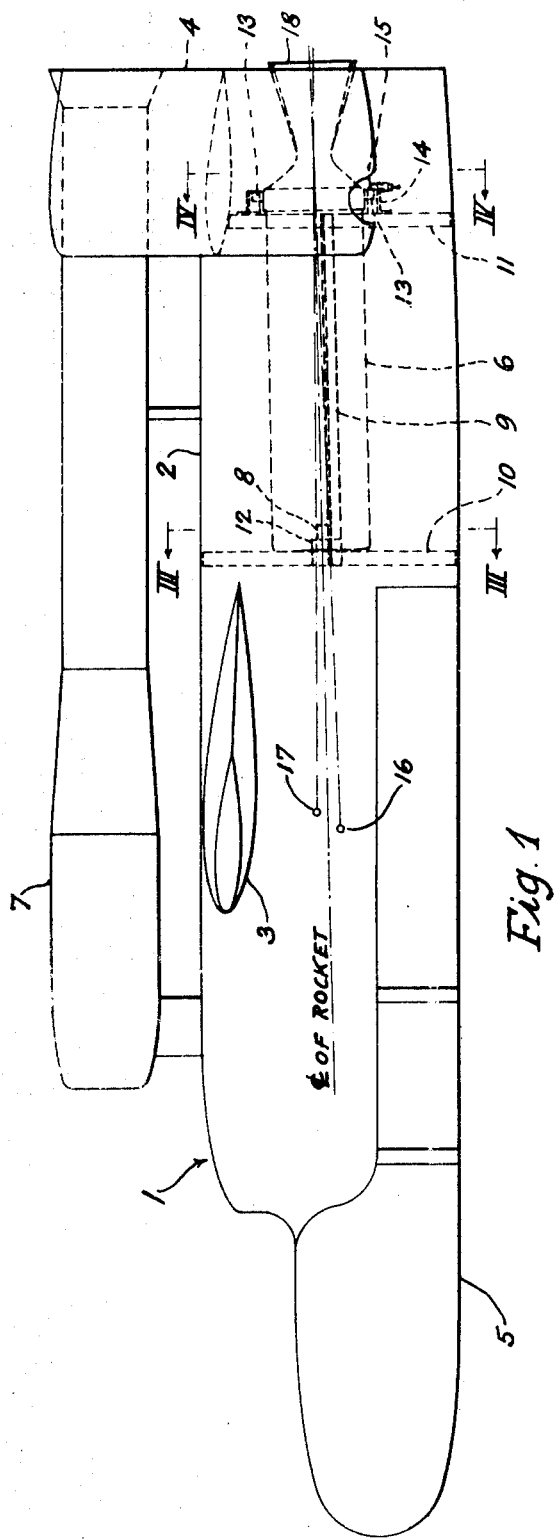
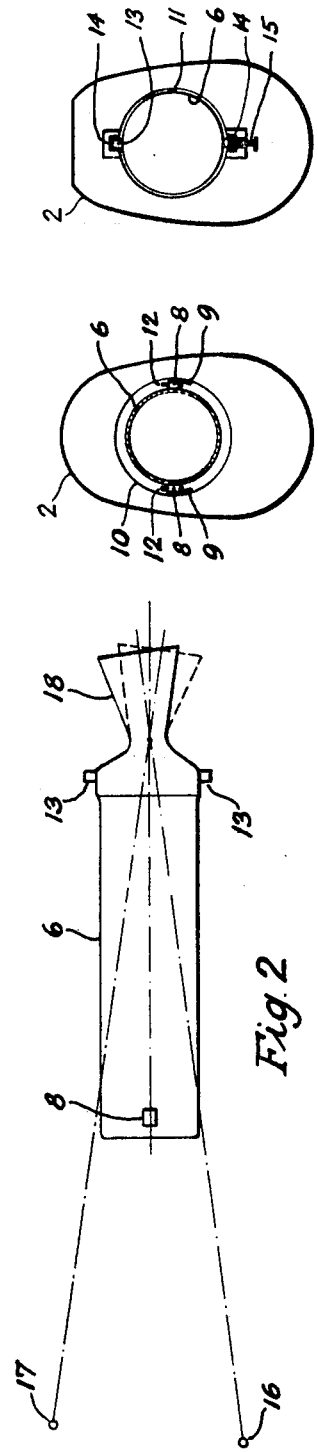
INVENTOR.
Donald R. Suchner
BY
H H Oldham
ATTORNEY

GUIDED MISSILES

This invention relates to the operation of guided missiles of the winged type launched by booster rockets and in particular to changeability of the rocket thrust direction in missiles having transformable configurations and, accordingly, different centers of gravity.

Missiles of this type may be powered with just a booster rocket for reaching a short range target, or for reaching a long range target it is equipped in addition thereto with a jet motor removably attached to the missile. Under these two conditions the positions of the centers of gravity of the missile through which must pass the thrust of the rocket propulsion are different and, accordingly, the direction of the rocket thrust must be made changeable.

Heretofore, the booster rocket was suspended below the fuselage of the missile and dropped after its energy was exhausted. The rocket in this case was made tiltable about a pivot so that the direction of its thrust could be chosen to pass through the center of gravity of the missile when equipped either with or without a jet power engine. However, jettisonable booster rockets have been abandoned and the rocket is now placed inside the fuselage. With this arrangement tilting of the rocket within the rather restricted available space is no more possible.

It is the general object of the invention to avoid and overcome the foregoing and other difficulties of and objections to prior art practices by providing from a fixed booster rocket support in a missile changeability of the direction of the rocket thrust without structural adjustments in the missile or the rocket.

Another object of the invention is to simplify changing of the rocket thrust in a missile from one direction into another to save time and labor.

The aforesaid objects of the invention and other objects which will become apparent as the description proceeds, are achieved by providing the rocket with a canted exhaust nozzle the center line of which passes in one position through the center of gravity of one configuration of the missile and when the rocket is turned 180° about its longitudinal axis the center line of its exhaust nozzle passes through the center of gravity of the other configuration of the missile.

For a better understanding of the invention reference should be had to the accompanying drawing, wherein FIG. 1 is a sideview of a wing-supported missile of one embodiment of the invention.

FIG. 2 is a schematic showing of the booster rocket with over-emphasized canting angle of the exhaust nozzle.

FIG. 3 is a cross-sectional view of the fuselage taken on line III—III of FIG. 1, and FIG. 4 is a cross-sectional view of the fuselage taken on line IV—IV of FIG. 1.

With specific reference to the form of the invention illustrated in the drawing the numeral 1 indicates in general the airframe of a missile including a fuselage 2, wings 3 supporting the fuselage, an empennage 4, a torpedo or payload 5, a booster rocket 6, and a removable mounted jet power motor 7. Missiles of this type may be used for short range attacks in which case the missile carries as power plant only a booster rocket 6, however, when used for a greater range the jet motor 7 is added to provide the propelling power for the missile after the rocket is burnt out. The rocket 6 is provided with laterally extending driving lugs 8 which rest on track angles 9 supported by the fuselage frames 10 and 11. The lugs 8 are in contact with thrust abutments 12 on the frame 10. Another pair of lugs 13, in vertical position, extend from near the rocket rear end and fit into sockets 14 on the frame 11 to fix the rocket against turning, and a spring latch 15 holds the rocket in place against sliding when the missile is in launching position.

For proper launching of the missile the rocket thrust must pass through the center of gravity of the missile which, in absence of a jet motor, is located at 16, and, when using a jet motor, at 17. To make this possible, the exhaust nozzle 18 of the rocket 6 is canted at its neck from the longitudinal center line of the rocket so that in one case the center line of the exhaust nozzle passes through the center of gravity at 16 and, when the rocket is turned 180° about its longitudinal axis, the center line of the exhaust nozzle will pass through the center of gravity at 17. Thus, it is possible without making structural adjustments on the rocket, or on its support, to direct the rocket thrust passing through one of the two centers of gravity through the other center of gravity just by turning the rocket 180° about its longitudinal axis.

From the foregoing detailed description it will be recognized that the idea of using a booster rocket capable to direct its thrust through either one of two centers of gravity of a guided missile transformable from one configuration into another has been solved in a most practical, simple and efficient manner at least cost.

While certain representative embodiments and details have been shown for the purpose of illustrating the invention, it will be apparent to those skilled in this art that various changes and modifications may be made therein without departing from the spirit or scope of the invention.

What is claimed:

1. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a jet booster, and means mounting the booster in association with the fuselage so that the line of thrust of the booster can be quickly changed to pass through either one of the said centers of gravity.

2. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket, said rocket having a rearwardly extending exhaust nozzle canted from the longitudinal center line of the rocket, and means releasably mounting the rocket in substantially parallel relation with said fuselage but turnable about the axis of the rocket so that the nozzle center line can be positioned to pass through a selected one of said centers of gravity.

3. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket disposed within and substantially parallel with said fuselage, a pair of rocket supporting tracks having their upper surface below the rocket center and adapted to support the rocket in one position or in a second position wherein the rocket is turned 180° about its longitudinal axis, driving lugs extending diametrically and transversely from the front end of the rocket and resting on said tracks, thrust abutment means on the fuselage for said driving lugs, a pair of vertically extending lugs on the rocket near the rocket rear portion, means on the fuselage for sideways holding said vertical lugs, latch means for longitudinally holding the rocket in place, and a rearwardly extending exhaust nozzle on the rocket, said nozzle being canted from the longitudinal center line of the rocket so that the nozzle center line in one position passes through one of said centers of gravity and when the rocket is turned 180° about its longitudinal center line the nozzle center passes through the other one of said centers of gravity.

4. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket disposed within and substantially parallel with said fuselage, a pair of rocket supporting tracks having their upper surface below the rocket center and adapted to support the rocket in one position or in a second position wherein the rocket is turned 180° about its longitudinal axis driving lugs extending diametrically and transversely from the front end of the rocket and resting on said tracks thrust abutment means on the fuselage for said driving lugs, latch means for longitudinally holding the rocket in place, and a rearwardly extending exhaust nozzle on the rocket, said nozzle being canted from the longitudinal center line of the rocket so that the nozzle center line in one position passes through one of said centers of gravity and when the rocket is turned 180° about its longitudinal center line the nozzle center passes through the other one of said centers of gravity.

5. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket disposed within and substantially parallel with said fuselage, a pair of rocket supporting tracks having their upper surface below the rocket center and adapted to support the rocket in one position or in a second position wherein the rocket is turned 180° about its longitudinal axis, latch means for longitudinally holding the rocket in place, and a rearwardly extending exhaust nozzle on the rocket, said nozzle being canted from the longitudinal center line of the rocket so that the nozzle center line in one position passes through one of said centers of gravity and when the rocket is turned 180° about its longitudinal center line the nozzle center passes through the other end of said centers of gravity.

6. In combination, an airframe having a fuselage and wings, a jet motor detachably mounted on the fuselage in substantially parallel relation thereto, the airframe having one center of gravity with the motor mounted thereon and a second center of gravity with the motor detached therefrom, a booster rocket disposed within and substantially parallel with said fuselage, a pair of rocket supporting tracks having their upper surface below the rocket center and adapted to support the rocket in one position or in a second position wherein the rocket is turned 180° about its longitudinal axis, and a rearwardly extending exhaust nozzle on the rocket, said nozzle being canted from the longitudinal center line of the rocket so that the nozzle center line in one position passes through one of said centers of gravity and when the rocket is turned 180° about its longitudinal center line the nozzle center passes through the other end of said centers of gravity.

* * * * *